United States Patent [19]

Riggs

[11] Patent Number: 4,512,129
[45] Date of Patent: Apr. 23, 1985

[54] ELECTROSTUD

[76] Inventor: John F. Riggs, P.O. Box 648, Stone Mountain, Ga. 30086

[21] Appl. No.: 371,565

[22] Filed: Jul. 12, 1982

[51] Int. Cl.³ .............................................. E04F 17/00
[52] U.S. Cl. ...................................... 52/364; 52/220; 52/376; 52/731
[58] Field of Search ................. 52/220, 221, 230, 802, 52/731, 376

[56] References Cited

U.S. PATENT DOCUMENTS

| 985,367 | 2/1911 | Pitney | 52/731 |
|---|---|---|---|
| 2,125,692 | 8/1938 | Ragsdale | 52/731 |
| 2,950,789 | 8/1960 | Davis et al. | 52/364 |
| 3,037,590 | 6/1962 | Pavlecka | 52/731 |
| 3,093,218 | 6/1963 | Peterson | 52/220 |
| 3,108,454 | 10/1963 | Raskin | 52/220 |
| 3,180,457 | 4/1965 | Bohnsack | 52/220 |
| 3,190,410 | 6/1965 | Mölstad | 52/731 |
| 3,270,472 | 9/1966 | Gilbert | 52/364 |
| 3,332,197 | 7/1967 | Hinkle | 52/731 |
| 3,478,477 | 11/1969 | Poyton | 52/220 |
| 3,596,424 | 8/1971 | Ward | 52/483 |
| 3,893,271 | 7/1975 | Kotlarz | 52/220 |
| 4,192,119 | 3/1980 | Murphy | 52/731 |
| 4,354,052 | 10/1982 | Albany | 52/220 |

FOREIGN PATENT DOCUMENTS 743672  1/1933  France .................... 52/377

Primary Examiner—Henry E. Raduazo

[57] ABSTRACT

A structural member composed of two separate conformations, when joined together form a rectangular column with three separate compartments.

3 Claims, 5 Drawing Figures

ELECTROSTUD

BACKGROUND OF THE INVENTION

The present invention is a type of metal dry wall stud housing an integral electrical raceway, hereafter referred to as the electrostud, to be used in any type of dry wall construction in conjunction with a lay in type ceiling. As is well known in the art, electrical wiring installed according to today's method is expensive in that a great deal of excess electrical housing is utilized to meet electrical code standards. In addition, all electrical outlet planning must be made prior to the installation of electrical wiring and erection of dry walls, a time-consuming, money-consuming process. Furthermore, with today's method of installing electrical wiring, if a vital switch or receptacle is overlooked when installing the wiring in a building and the dry wall is inadvertently installed, a tremendous expense and inconvenience is incurred in order to install the forgotten switch or receptacle in the completed dry wall. Or, if a new tenant leases a building and is not satisfied with the builder's choice of location of wall receptacles, another tremendous expense is incurred to install more outlets to suit the new tenant.

SUMMARY OF THE INVENTION

It is therefore an object of the present invention to drastically reduce the high costs of labor and materials as well as to reduce the inconvenience of poor planning incurred in today's method of electrical wiring. A further object of the invention is its ability to serve two purposes: firstly, as an electrical wiring raceway and secondly, as a safe foundation in which dry wall screws can be driven without interfering with further electrical wiring. It is another object of the present invention to require easily manufactured parts as set forth in the following description of the electrostud.

BRIEF DESCRIPTION OF THE DRAWING

FIG. 2 is a perspective view of the electrostud in its entirety depicting punchout holes in the electrostud's facade (also identically placed in the rear wall of the stud, but not pictured in the diagram), bearing in mind that the stud is comprised of two identical structural members as seen in FIG. 1a.

DESCRIPTION OF THE INVENTION

Figure 1A:
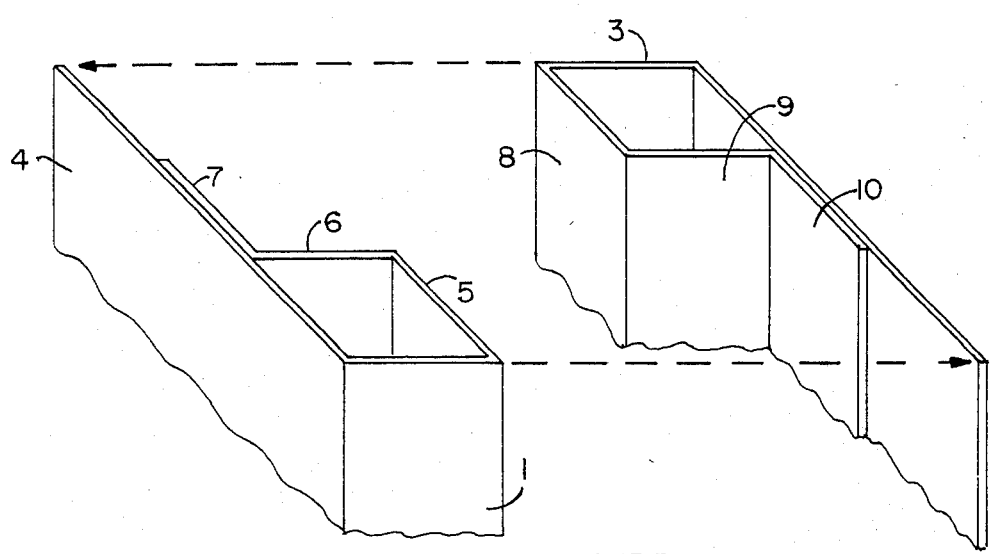
FIG. 1a is a perspective view showing two identically manufactured structural members to be joined together to form a metal stud with an interior compartment or raceway.
Figure 1B:
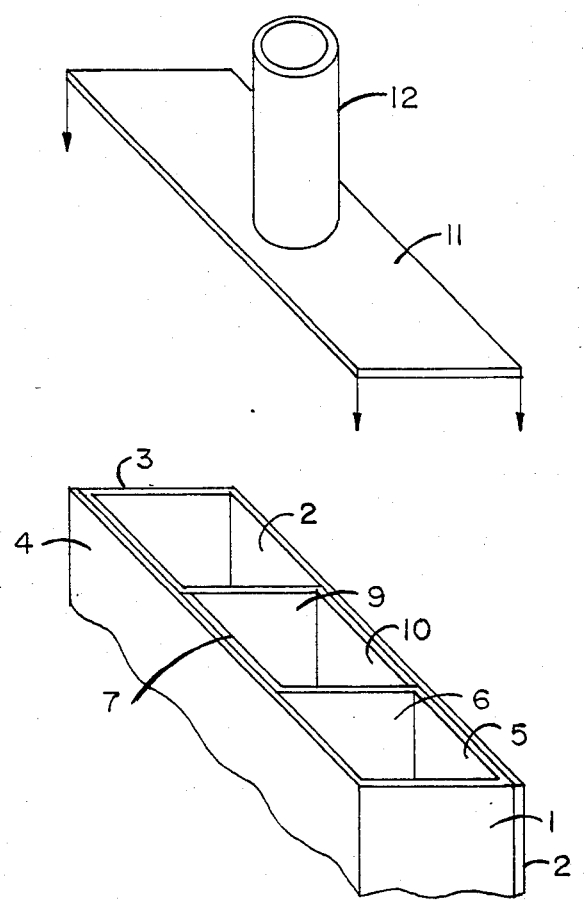
FIG. 1b is a perspective view showing FIG. 1a members joined (done so during manufacture either by welding, soldering or riveting) with a metal top ceiling plate equipped with a protruding metal nipple in its center.

As illustrated in FIGS. 1a and 1b, there is shown a metal building stud hereinafter referred to as an electrostud being formed from two sheets of metal, each capable of receiving self-driving sheetrock screws, each said metal sheet having at least 3 right angle bends in a first direction dividing that sheet into 3 sheet segments, the first sheet segment (2,4) being the width of a standard stud and forming aside of the electrostud, the second sheet segment forming a nailing surface for the electrostud (1,3). The third sheet segment forms an attachment surface (5,8) for joining the said two sheets of metal back-to-back and having a width substantially less than half the width of the first segment but greater than the length of a standard self-driving sheet rock screw. The fourth sheet segment (6,9) has a width equal to the distance between the first and third segments to enclose a screw receiving compartment, said two sheets of metal being joined back-to-back to form an electrostud having two screw receiving compartments and an intermediate electrical compartment.

An electrostud wherein each said metal sheet has a fourth right angle bend extending in a direction opposite that of the first three bends said fourth bend defining a fifth sheet segment which is joined to the first segment of the same sheet (2,10 4,7).

Figure 2:
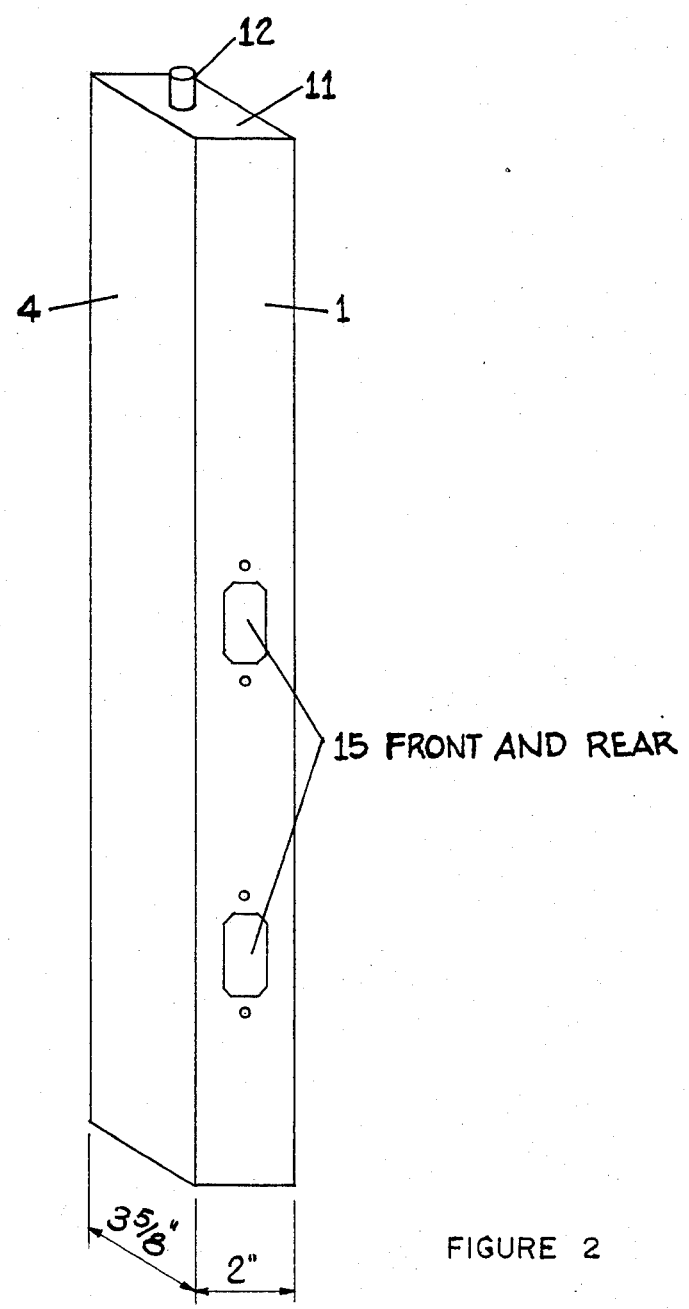

The rectangular column formed by the said joining of the two sheets of metal to be capped with a rectangular section (11) and a ¾" electrical metallic tubing (12) joined as one unit for the purpose of accessibility of the previously formed electrical wiring space, better depicted in FIG. 2.

An electrostud wherein the (1,3) and fourth (6,9) sheet segments have aligned punch out portions (15,17) forming an electrical outlet.

Figure 3B:
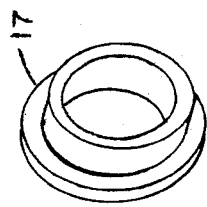
FIG. 3b is an enlarged diagram of the protective seals shown in FIG. 3a, placed at the same angle.
Figure 3A:
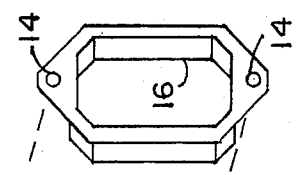
FIG. 3a is an enlarged cross-section of the electrostud depicting an electrical raceway within the stud, with accessibility to the raceway via the interior circular openings housing protective seals and the exterior squared openings being left open to allow insertion of a sheet metal collar shown in the same diagram.
Figure 3A:
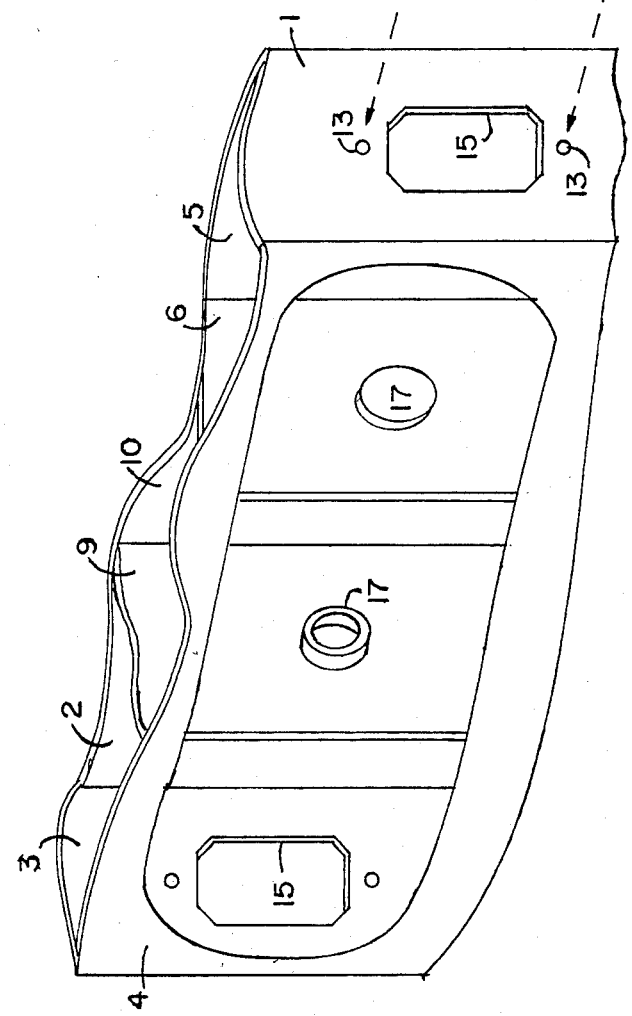

As shown in FIG. 3a and FIG. 3b, a protective phenolic compound plug (17) is to be installed during manufacture for later removal to give access to the interior wiring compartment.

The second sheet segment (1,3) having punched out holes (15) for the purpose of accepting a sheet metal collar (16) comprising a support for electrical devices such as toggle switches, receptacles, etc. Holes 13 and 14 are for the purpose of self-tapping sheet metal screws normally used with said devices.

I claim:

1. An electrostud said stud being formed from two sheets of metal each capable of receiving self-driving sheetrock screws, each said metal sheet having at least 3 right angle bends in a first direction dividing that sheet into three sheet segments, the first sheet segment being the width of a standard stud and forming a side of the electrostud, the second sheet segment forming a nailing surface for the electrostud, the third sheet segment forming an attachment surface for joining the said two sheets of metal back-to-back and having a width substantially less than half the width of the first segment but greater than the length of a standard self-driving sheet rock screw, and the fourth sheet segment having a width equal to the distance between the first and third segments to enclose a screw receiving compartment, said two sheets of metal being joined back-to-back to form an electrostud having two screw receiving compartments and an intermediate electrical compartment.

2. An electrostud as claimed in claim 1 wherein each said metal sheet has a fourth right angle bend extending in a direction opposite that of the first three bends said fourth bend defining a fifth sheet segment which is joined to the first segment of the same sheet.

3. An electrostud as in claim 1 wherein the second and fourth sheet segments have aligned punch out portions forming an electrical outlet.

* * * * *

UNITED STATES PATENT AND TRADEMARK OFFICE
CERTIFICATE OF CORRECTION

PATENT NO. : 4,512,129
DATED : April 23, 1985
INVENTOR(S) : John F. Riggs

It is certified that error appears in the above-identified patent and that said Letters Patent is hereby corrected as shown below:

Column 1, line 68, should read:

capable of receiving self-driving dry wall screws, each

Column 2, line 10, should read:

than the length of a standard self-driving dry wall

Column 2, line 44, should read:

dry wall screws, each said metal sheet having at least

Column 2, line 54, should read:

dry wall screw, and the fourth sheet segment having

Signed and Sealed this

Thirty-first Day of December 1985

[SEAL]

Attest:

DONALD J. QUIGG

Attesting Officer

Commissioner of Patents and Trademarks